United States Patent Office 3,048,625
Patented Aug. 7, 1962

3,048,625
PRODUCTION OF WATER-SOLUBLE SALTS OF ALPHA,BETA-ETHYLENICALLY UNSATURATED SULFONIC ACIDS
Harry Distler and Karlhugo Kuespert, Ludwigshafen (Rhine), Germany, assignors to Badische Anilin- & Soda-Fabrik Aktiengesellschaft, Ludwigshafen (Rhine), Germany
No Drawing. Filed Dec. 29, 1959, Ser. No. 862,448
Claims priority, application Germany Jan. 7, 1959
7 Claims. (Cl. 260—513)

This invention relates to a process for the production of water-soluble salts of alpha,beta-ethylenically unsaturated sulfonic acids. More particularly, it relates to a process for the production of water-soluble salts of vinylsulfonic acid.

It is known to prepare vinylsulfonic acid or its salts by alkaline saponification of carbyl sulfate. This method has not found favor however because carbyl sulfate is not easy to prepare on an industrial scale. It is also known to prepare alkali salts of vinyl sulfonic acid by reaction of alkali chlorethanesulfonates with alkaline compounds.

The water-soluble salts of alpha,beta-ethylenically unsaturated sulfonic acids, especially of vinylsulfonic acid, are obtained especially simply and advantageously according to this invention by reacting beta-chlorethane sulfochloride, which may if desired be substituted in alpha- or beta-position, in aqueous solution with a metal oxide or hydroxide or carbonate which is capable of forming a chloride under the reaction conditions.

As the initial compound according to this invention there may be used beta-chlorethane sulfochloride readily accessible by sulfochlorination of ethyl chloride according to Reed. See, for example, the U.S. patent to Reed, Re. 20,968. The said initial compound may be substituted in alpha- or beta-position by alkyl, halogenalkyl, aralkyl or aryl radicals. Examples of such compounds are 1,3-dichlorpropane-2-sulfochloride, 1,2-dichlorpropane-3-sulfochloride, 2-chlorpropane-1-sulfochloride, 2,3-dichlorbutane-1-sulfochloride, 2,3-dichlorbutane-1,4-disulfochloride, 1-chlor-1-phenylethanesulfochloride and the like.

Beta-chlorethane sulfochloride is however of special interest; from this the water-soluble salts of vinylsulfonic acid are obtained by the method according to this invention.

For splitting off the hydrogen chloride there may be used metal oxides or hydroxides or carbonates which form chlorides under the reaction conditions. There is obtained in each case the salt of vinylsulfonic acid with the metal of the oxide, hydroxide or carbonate used for the splitting off of the hydrogen chloride.

Oxides or hydroxides of metals suitable for splitting off hydrogen chloride are especially the oxides or hydroxides of alkali or alkaline earth metals. Ammonium is to be understood as being included among the alkali metals in the present specification because the splitting off of the hydrogen chloride may equally well be carried out with ammonium hydroxides, i.e. with an aqueous solution of ammonia. Metal carbonates, for example sodium carbonate or potassium carbonate, may also be used instead of the metal oxides or hydroxides.

The splitting off of the hydrogen chloride is preferably carried out with the hydroxides of the alkali or alkaline earth metals, and the salts of vinylsulfonic acid with these metals are thereby obtained. If the water-soluble salts of vinylsulfonic acid with other metals are to be prepared, there may also be used for example zinc oxide, lead oxide or copper oxide for splitting off the hydrogen chloride. These metal oxides do not offer any advantage however and are only to be used when it is desired to prepare the corresponding salts.

Suitable compounds by means of which hydrogen chloride may be split off from beta-chlorethanesulfochlorides are for example lithium hydroxide, sodium hydroxide or potassium hydroxide. Magnesium hydroxide, calcium hydroxide or barium hydroxide may also be used for splitting off hydrogen chloride.

These compounds are used in a minimum amount of 3 mols of metal compound to 1 mol of beta-chlorethane sulfochloride. If less is used, the reaction is incomplete. However it is not in general necessary to use considerably more. The maximum amount is about 6 mols to 1 mol of the beta-chlorethane sulfochloride.

It is preferable to work by allowing the sulfonic acid chlorides and the metal salts to flow slowly from separate containers into water. The pH value may vary within wide limits; it is advantageous however if the pH value is less than 8, preferably in the acid region below 7. The reaction temperature may lie between about 0° C. and 100° C., advantageously between room temperature and about 60° C. By the term "aqueous solution" we understand solutions, which contain water, or mixtures of water with other solvents, which contain a major amount of water.

The water-soluble salts of alpha,beta-ethylenically unsaturated chlorsulfonic acids prepared according to this invention and obtained in the form of dilute aqueous solutions can be freed from the bulk of the alkali chlorides formed by the reaction by concentration in vacuo. In many cases however it is possible to work up the solution directly, for example as comonomers for the production of copolymers. The vinylsulfonates prepared by the process according to this invention are pure white and thereby differ especially advantageously from the vinyl sulfonates which are obtained by alkaline reaction of beta-chlorethane sulfonates.

The following examples will further illustrate this invention but the invention is not restricted to these examples. The parts specified in the examples are parts by weight.

*Example 1*

800 parts of water are placed in a vessel provided with a stirrer and with electrodes for measuring pH value. Into the vessel, while maintaining a pH value of 4 to 6 and at a temperature of about 40° to 60° C., there are allowed to flow in simultaneously 163 parts of beta-chlorethane sulfochloride and 600 parts of 20% aqueous caustic soda solution. The reaction is ended after 45 minutes. The reaction mixture is concentrated in vacuo and freed from the precipitated sodium chloride by filtration. There is obtained an about 52% solution of the sodium vinylsulfonate in water which can be further worked up or dried in known manner.

*Example 2*

163 parts of beta-chlorethane sulfochloride mixed with 800 parts of water are allowed to flow while stirring at about 40° C. into a stirring vessel and 343 parts of 35% aqueous caustic soda solution are also allowed to flow in. The pH value of the reaction mixture is kept between 3 and 4 and toward the end of the reaction the pH value is allowed to rise to 7. The reaction is ended after 60 minutes. The reaction mixture is worked up as in Example 1. A 47% solution of sodium vinylsulfonate in water is obtained which remains colorless even after prolonged standing.

*Example 3*

500 parts of water are heated to 100° C. in a stirring vessel. Into the same there are allowed to flow 14 parts of beta-chlorethane sulfochloride and 880 parts of a 4% by weight solution of barium hydroxide in water. The pH of the solution rises to 14. After cooling, the excess of barium ions is precipitated by leading in carbon dioxide. The solution is filtered off from the barium carbonate formed and the residue concentrated in vacuo at 50° to 60° C. A colorless solution of barium vinylsulfonate in water is obtained.

*Example 4*

163 parts of beta-chlorethane sulfochloride and 113 parts of calcium hydroxide in 1000 parts of water are added simultaneously at a temperature of 20° to 30° C. to 1500 parts of water. The pH is maintained at about 4 to 5 during the addition. It rises in the course of the reaction to about 6 to 7. The solution of calcium vinylsulfonate obtained is filtered and concentrated in vacuo.

*Example 5*

163 parts of beta-chlorethane sulfochloride and a solution of 160 parts of sodium carbonate in 1000 parts of water are allowed to flow at a temperature of 20° to 30° C. into 1500 parts of water. The pH is kept at 4 to 7. A solution of sodium vinylsulfonate is obtained which can be concentrated by evaporation.

*Example 6*

The reaction is carried out under the same conditions as in Example 5 but 188 parts of potassium hydroxide are used instead of 160 parts of sodium carbonate. An aqueous solution of potassium vinylsulfonate is obtained.

*Example 7*

16.3 parts of beta-chlorethane sulfochloride and 13.6 parts of a 9% by weight solution of caustic soda in water are allowed to flow simultaneously into 150 parts of water at a temperature between 20° and 30° C. The pH is kept first at 10 to 11 during the reaction. It then falls toward the end of the addition of caustic soda solution to about 8. A solution of sodium vinylsulfonate in water is obtained.

The same result is achieved by working at a pH between 3.5 and 4 and at a reaction temperature of 100° C.

*Example 8*

489 parts of beta-chlorethane sulfochloride and 666 parts of a 23% by weight aqueous solution of ammonia are allowed to flow from separate vessels into 1500 parts of water at a temperature between 30° and 35° C. in the course of 4 hours. The solution is concentrated to about one third of its volume in a vaporizer and freed from deposited ammonium chloride. A colorless solution of ammonium vinylsulfonate in water is obtained.

What we claim is:

1. A process for the production of water-soluble salts of vinylsulfonic acid which comprises reacting beta-chlorethane sulfochloride in an aqueous solution at a temperature of between 0° and 100° C. and at a pH value of less than 8 with 3 to 6 mols with reference to one mol of said beta-chlorethane sulfochloride of a compound capable of forming a chloride, said compound being selected from the group consisting of oxides, hydroxides and carbonates of alkali metals, alkaline earth metals and ammonium.

2. A process for the production of water-soluble salts of vinylsulfonic acid which comprises reacting beta-chlorethane sulfochloride in an aqueous solution at a temperature of between room temperature and 60° C. and at a pH value below 7 with 3 to 6 mols with reference to one mol of said beta-chlorethane sulfochloride of a compound capable of forming a chloride, said compound being selected from the group consisting of oxides, hydroxides and carbonates of alkali metals, alkaline earth metals and ammonium.

3. A process as claimed in claim 2, wherein caustic soda is used as the compound capable of forming a chloride.

4. A process as claimed in claim 2, wherein sodium carbonate is used as the compound capable of forming a chloride.

5. A process as claimed in claim 2, wherein calcium hydroxide is used as the compound capable of forming a chloride.

6. A process as claimed in claim 2, wherein potassium hydroxide is used as the compound capable of forming a chloride.

7. A process as claimed in claim 2, wherein ammonium hydroxide is used as the compound capable of forming a chloride.

References Cited in the file of this patent

UNITED STATES PATENTS 2,839,573    Catlin et al. _____ June 17, 1958

OTHER REFERENCES

Suter: "The Organic Chemistry of Sulfur," 1944, page 170. (Copy in Scientific Library.)